(12) United States Patent
Chang et al.

(10) Patent No.: US 10,890,802 B2
(45) Date of Patent: Jan. 12, 2021

(54) OPTICAL LENS, BACKLIGHT MODULE AND DISPLAY DEVICE USING SAME

(71) Applicant: ADVANCED OPTOELECTRONIC TECHNOLOGY, INC., Hsinchu Hsien (TW)

(72) Inventors: Chao-Hsiung Chang, Hsinchu (TW);
Lung-Hsin Chen, Hsinchu (TW);
Wen-Liang Tseng, Hsinchu (TW);
Pin-Chuan Chen, Hsinchu (TW);
Hsin-Chiang Lin, Hsinchu (TW);
Hou-Te Lin, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 0 days.

(21) Appl. No.: 16/680,784

(22) Filed: Nov. 12, 2019

(65) Prior Publication Data

US 2020/0326594 A1    Oct. 15, 2020

(30) Foreign Application Priority Data

Apr. 10, 2019    (CN) .......................... 2019 1 0284016

(51) Int. Cl.
*G02F 1/13357*    (2006.01)

(52) U.S. Cl.
CPC .. *G02F 1/133606* (2013.01); *G02F 1/133605* (2013.01); *G02F 1/133603* (2013.01); *G02F 2001/133607* (2013.01)

(58) Field of Classification Search
CPC ....................................... G02F 1/1333–133611
USPC .................................................. 362/97.1–97.4
See application file for complete search history.

(56) References Cited

U.S. PATENT DOCUMENTS 9,465,251 B2 * 10/2016 Lee .................... G02F 1/133603
9,477,116 B2 * 10/2016 Hiraka .............. G02F 1/133611
10,488,562 B2    11/2019 Chang et al.

FOREIGN PATENT DOCUMENTS

TW        201310084 A1    3/2013
TW        201809540 A     3/2018

* cited by examiner

*Primary Examiner* — Jason M Han
(74) *Attorney, Agent, or Firm* — ScienBiziP, P.C.

(57) ABSTRACT

A backlight module capable of simple manufacture and a display device using the backlight module are provided. A reflective sheet to redirect the light from LEDs or other light source is located in position on the backlight module by means of optical lenses, which also spread the light for better uniformity of lighting. The optical lens includes inclined surfaces which form an opening with a circuit board that allows engagement of a reflective sheet. The reflective sheet is between the optical lens and the circuit board. The manufacturing step of fixing the reflective sheet to the circuit board is not required, and when any LED or other light emitting element, or the circuit board itself, fails, it is only necessary to disassemble the optical lens at the one position. Assembly and maintenance efficiency are improved, and the reliability of the backlight module and the display device is improved.

14 Claims, 14 Drawing Sheets

OPTICAL LENS, BACKLIGHT MODULE AND DISPLAY DEVICE USING SAME

FIELD

The subject matter herein generally relates to an optical lens, a backlight module using the optical lens and a display device using the backlight module.

BACKGROUND

A typical backlight module includes a back plate, a plurality of light source assemblies, and a reflecting sheet. Each of the light source assemblies includes a circuit board mounted on a back plate and a plurality of light emitting diodes (LEDs) electrically connected to the circuit board. The reflecting sheet defines a plurality of through holes, each of which corresponds to one LED, and each LED extends through one through hole to connect to the circuit board. The reflecting sheet includes a plurality of hanging ears, each of which defines a hanging hole, and correspondingly, the back plate includes a plurality of positioning members. In assembly, each of the hanging ears of the reflecting sheet is hung on one positioning member through its hanging hole to realize the preliminary positioning of the reflecting sheet. Then, the reflecting sheet is repeatedly moved so as to be positioned precisely, and the reflecting sheet is adhered to the back plate or the circuit board by an adhesive, thereby realizing the final positioning of the reflecting sheet.

However, due to the preliminary positioning and final positioning of the reflecting sheet, the assembly efficiency is low. In additional, the repeated movement of the reflective sheet may lower the adhesiveness of the adhesive, thereby affecting the reliability of the backlight module. Furthermore, when a certain LED or circuit board fails, the LED or circuit board can be replaced or repaired only after the preliminary positioning and the final positioning of the reflecting sheet are removed, thus the maintenance efficiency is low. Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

In this disclosure, an optical lens having at least one inclined surface, a backlight module using the optical lens, and a display device using the backlight module are provided. The inclined surface of the optical lens forms an opening with a circuit board that allows a reflective sheet to be engaged. The reflective sheet is engaged in the opening to hold the reflective sheet between the optical lens and the circuit board. Compared with conventional art, step of fixing the reflective sheet to the circuit board and the back plate is not required. When any one of light emitting elements (e.g., LEDs) or the positioning of the circuit board fails, it is only necessary to disassemble the optical lens at the one position. Thus, assembly and maintenance efficiency are improved, and the reliability of the backlight module and the display device is improved.

First Embodiment

Figure 1:
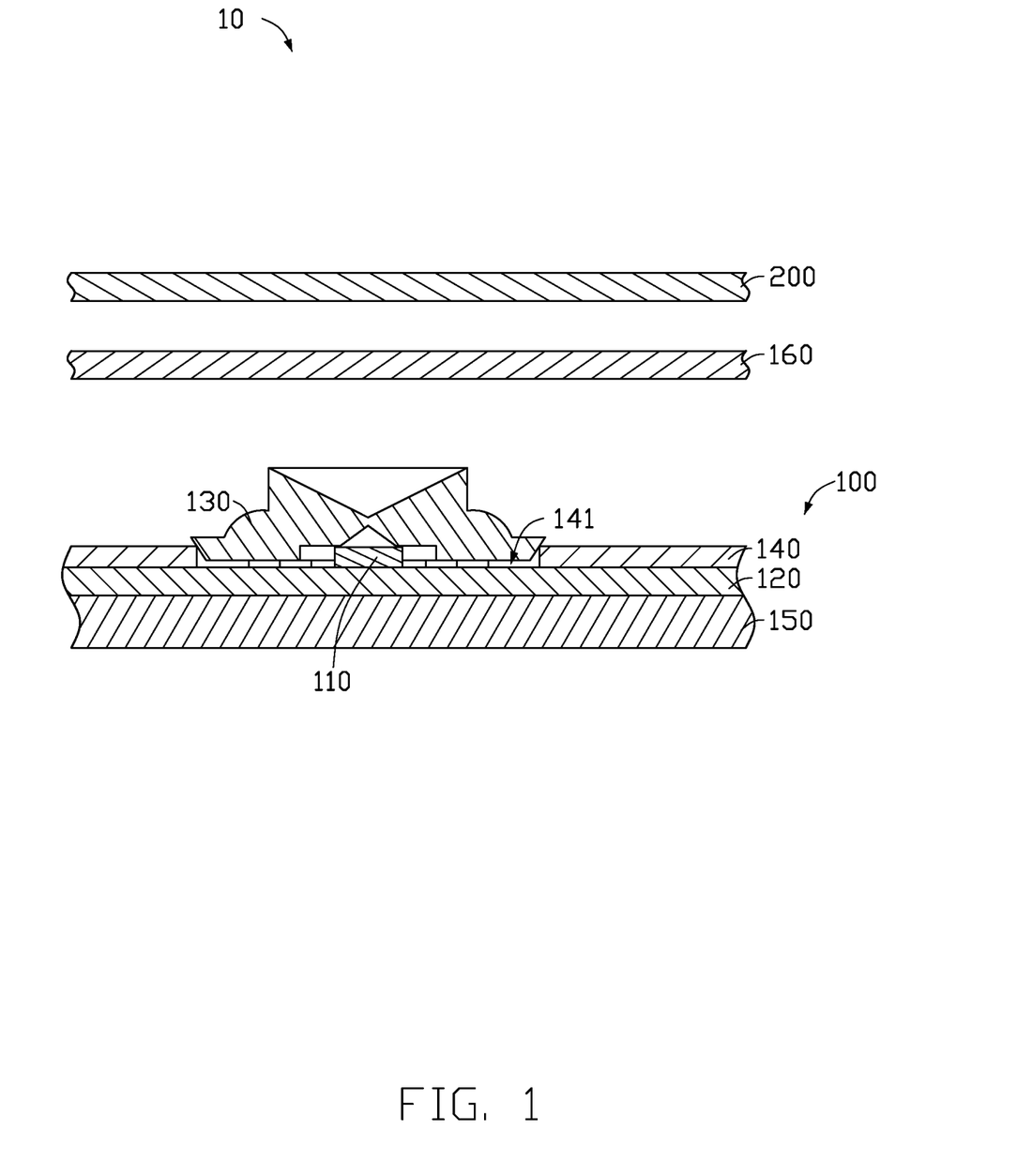
FIG. 1 is a cross-sectional view of a display device.

FIG. 1 shows a display device 10 according to a first embodiment. The display device 10 includes a display panel 200, a backlight module 100, and a diffusion plate 160 between the display panel 200 and the backlight module 100. The backlight module 100 is configured to provide backlight to the display panel 200 for image display. The diffusion plate 160 is configured to diffuse the backlight emitted from the backlight module 100 and provide uniform light to the display panel 200.

Figure 2:
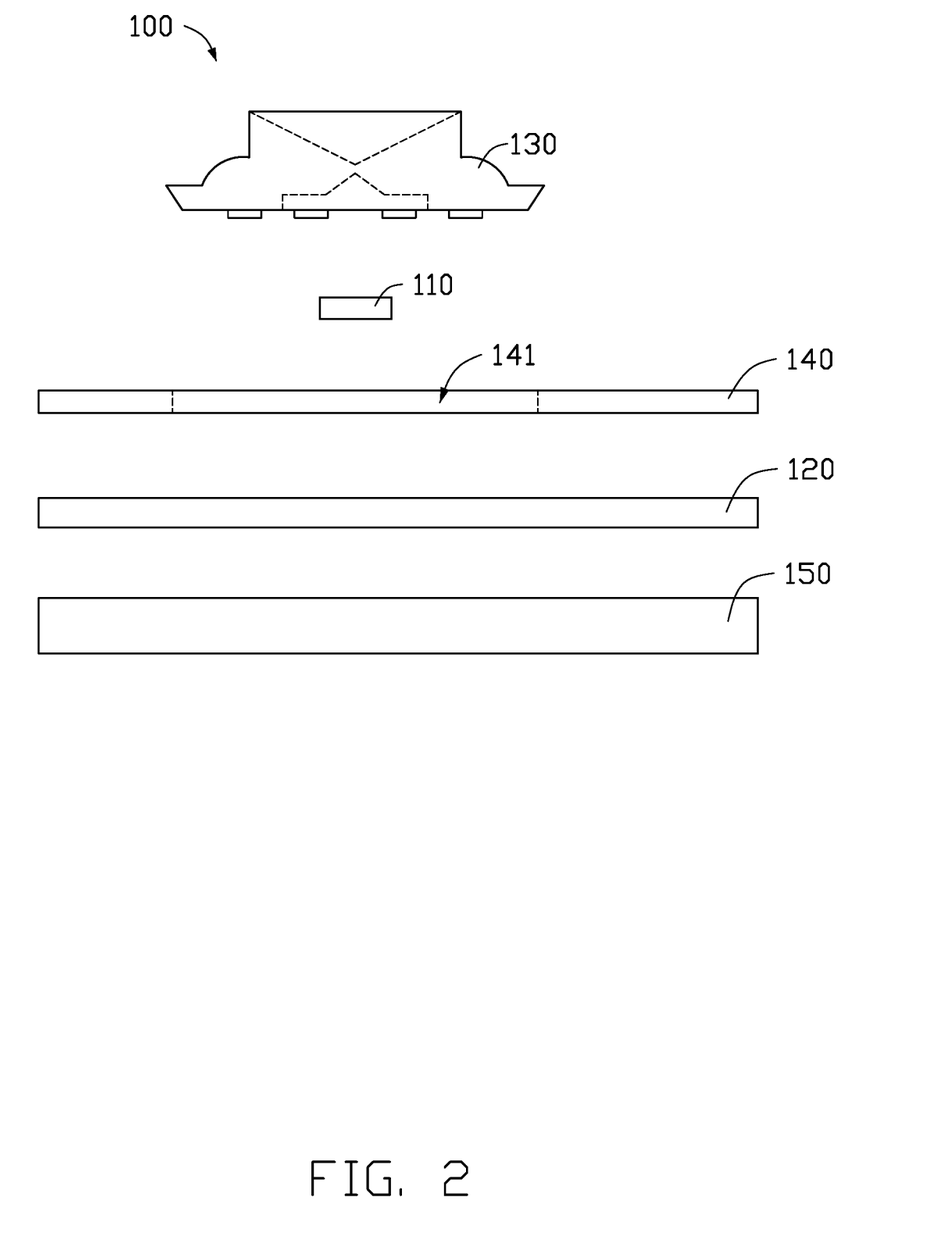
FIG. 2 is an exploded view of a backlight module in the device shown in FIG. 1.

As shown in FIG. 2, the backlight module 100 includes a back plate 150, a circuit board 120, a reflective sheet 140, a plurality of light emitting elements 110 (only one is shown in FIG. 2), and a plurality of optical lenses 130 (only one is shown in FIG. 2). The reflective sheet 140 defines a plurality of through holes 141 (only one is shown in FIG. 2). Each of the through holes 141 corresponds to and is aligned with one light emitting element 110.

In one embodiment, the circuit board 120 is a printed circuit board (PCB)). The light emitting elements 110 are light emitting diodes (LEDs). The circuit board 120 has a strip shape and carries the light emitting elements 110. Each of the light emitting elements 110 is covered by one optical lens 130. In the case where the backlight module 100 is applied to a display device such as a television or a computer, the backlight module 100 includes a plurality of circuit boards 120.

Figure 3:
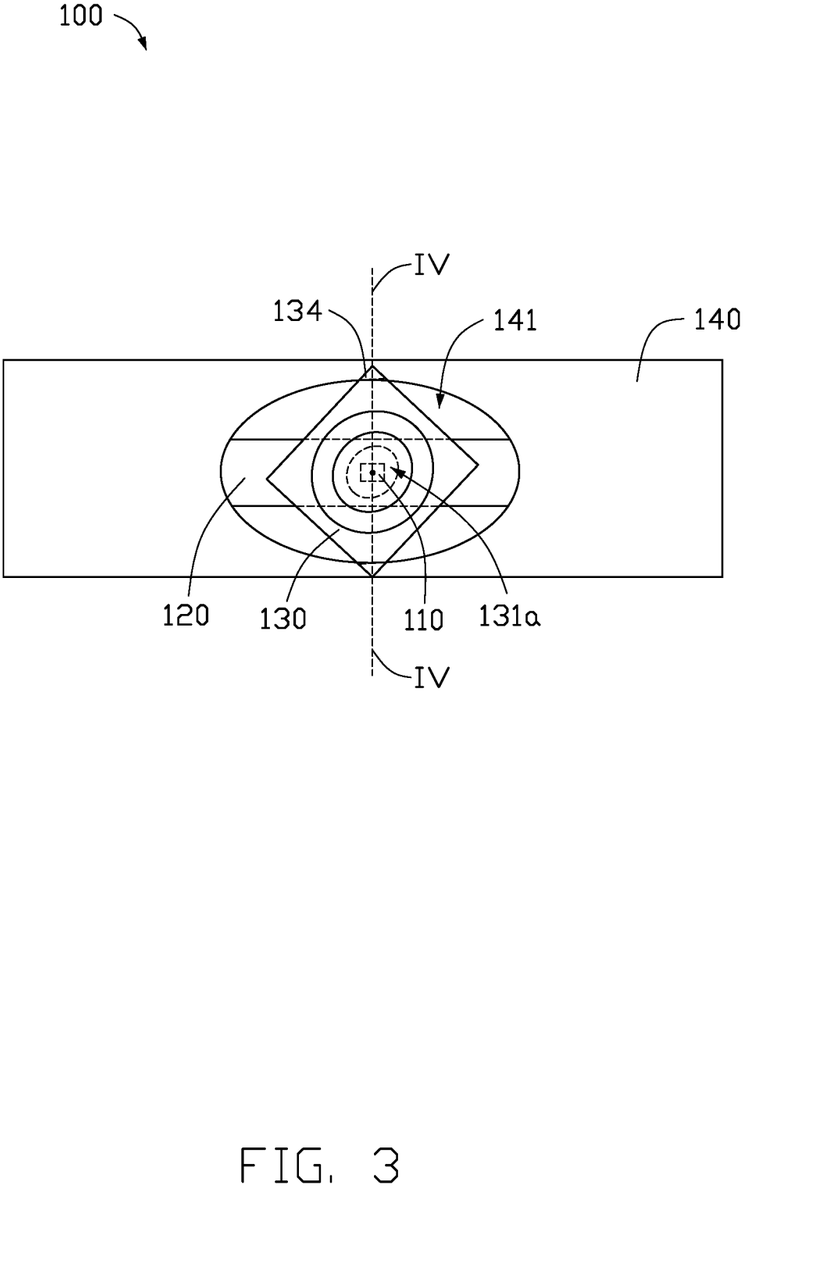
FIG. 3 is a bottom view of a backlight module.
Figure 4:
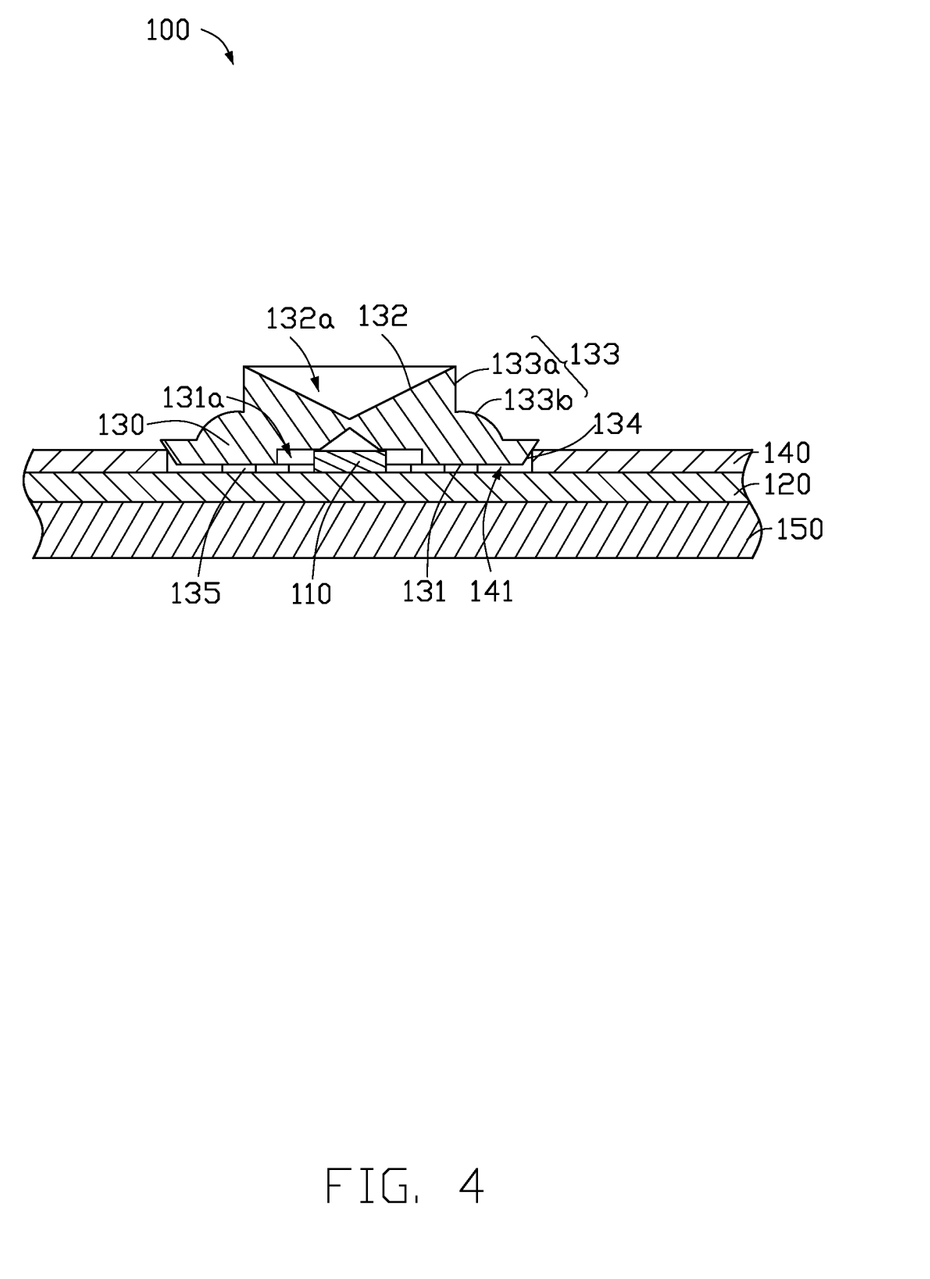
FIG. 4 is a cross-sectional view taken along line IV-IV of FIG. 3.

As shown in FIGS. 3 and 4, the light emitting element 110 is electrically connected to the circuit board 120. The optical lens 130 is mounted on the circuit board 120. The optical lens 130 includes a bottom surface 131 and a top surface 132 opposite to the bottom surface 131. The bottom surface 131 is planar and defines a receiving space 131a. The receiving space 131a is recessed upwardly from a middle of the bottom surface 131 of the optical lens 130, which is used to receive the light emitting element 110. The light emitting element 110 is received in the receiving space 131a of the optical lens 130. The optical lens 130 redirects the light emitted from the light emitting element 110. The reflective sheet 140 is on the circuit board 120 and configured for reflecting the light emitted from the optical lens 130 such that light incident on the reflective sheet 140 is emitted toward a light emitting direction of the backlight module 100.

As shown in FIG. 4, the optical lens 130 further includes at least one inclined surface 134 extending from an outer periphery of the bottom surface 131 toward the top surface 132. The inclined surface 134 and the bottom surface 131 intersect to form an obtuse angle. That is, the inclined surface 134 is inclined outwards toward the top surface 132 with respect to the bottom surface 131. A distance from one point close to the top edge of the inclined surface 134 diametrically-opposite or geometrically-opposite to a horizontally-level point on surface 134 is equal or greater than the diameter of the through hole 141.

In one embodiment, the inclined surface 134 is a flat surface. In other embodiments, the inclined surface 134 may be curved, for example, a concave or convex curved surface, or a free-curved surface of other shape that provides an obtuse angle between the inclined surface 134 and the bottom surface 131.

The reflective sheet 140 is engaged (specifically by means of the through hole 141) in an opening formed by the inclined surface 134 of the optical lens 130 and the circuit board 120. In other words, the portion of the optical lens 130 where the inclined surface 134 is formed extends out of the through hole 141 to make contact with the surface of the reflective sheet 140 which is away from the circuit board 120. The portion of the optical lens 130 where the inclined surface 134 is formed extends out of the through hole 141 and above the reflective sheet 140. That is, an extension of the inclined surface 134 is beyond an extension of the through hole 141.

Figure 5:
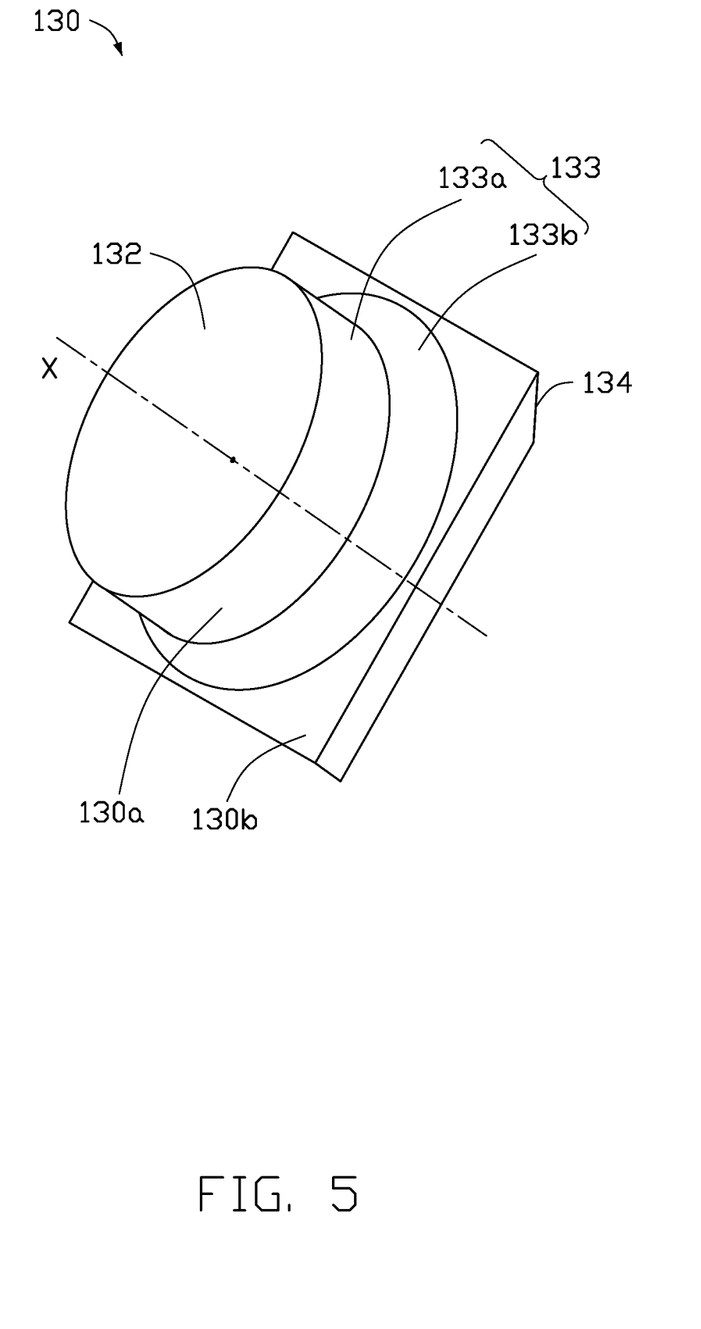
FIG. 5 is an isometric view of an optical lens of the device shown in FIG. 1.
Figure 6:
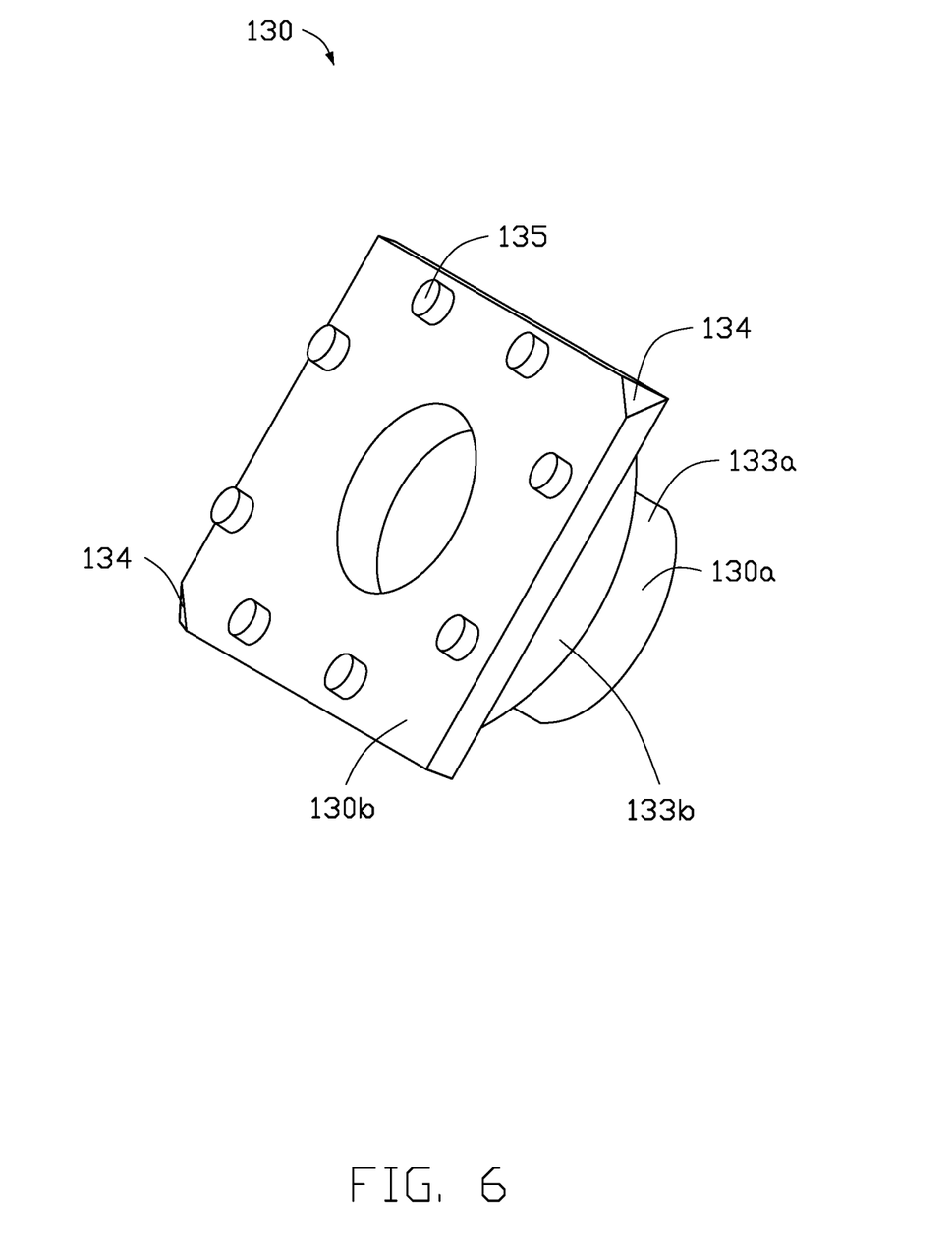
FIG. 6 is an isometric view of the optical lens.

As shown in FIGS. 5 and 6, the optical lens 130 includes a body portion 130a and a base 130b connected to the body portion 130a. The base 130b can be circular or can have a polygonal profile, and if polygonal the inclined surface 134 forms at least one vertex of the polygonal profile.

Figure 8:
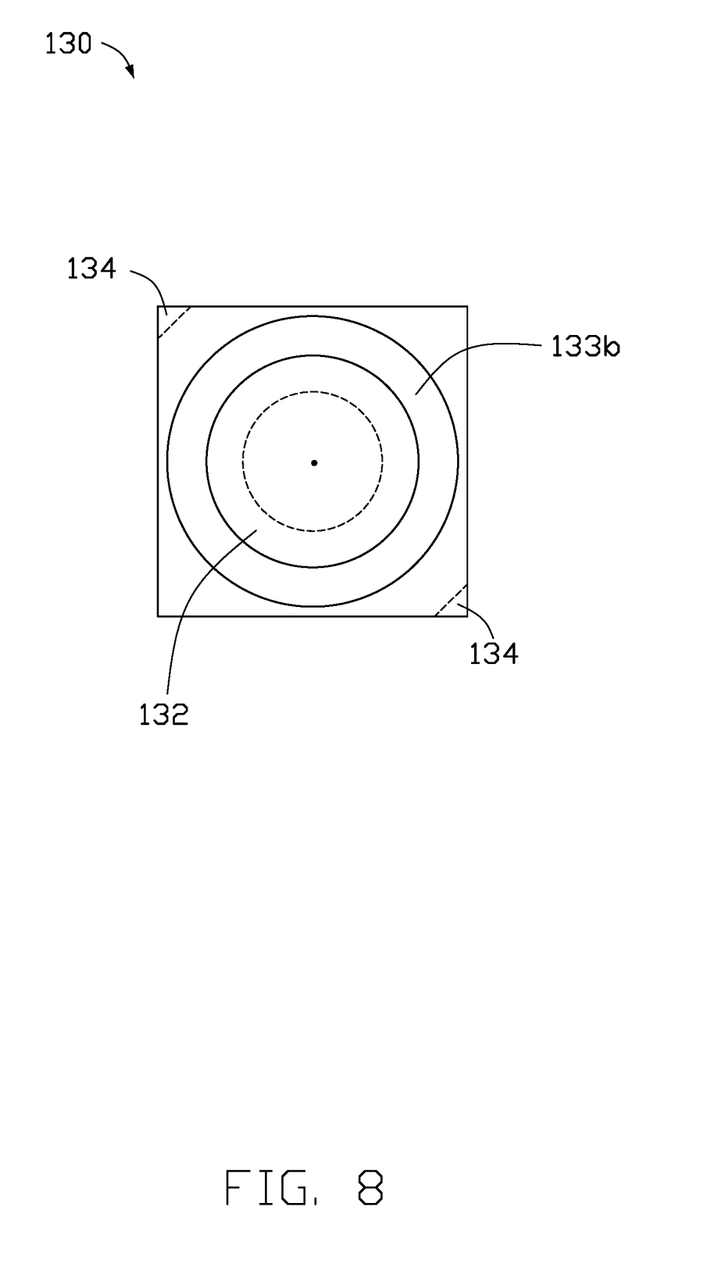
FIG. 8 is a top view of the optical lens.

As shown in FIGS. 5, 6 and 8, the polygonal profile of the base 130b is square, and two inclined surfaces 134 are formed at two opposite sides of the base 130b. In other embodiments, shape, number, and positions of the inclined surface 134 can be designed according to actual needs. It is necessary to ensure that the reflective sheet 140 is engaged (by means of the through hole 141) in the opening formed by the inclined surface 134 and the circuit board 120 after the optical lens 130 is fixed to the circuit board 120.

Figure 7:
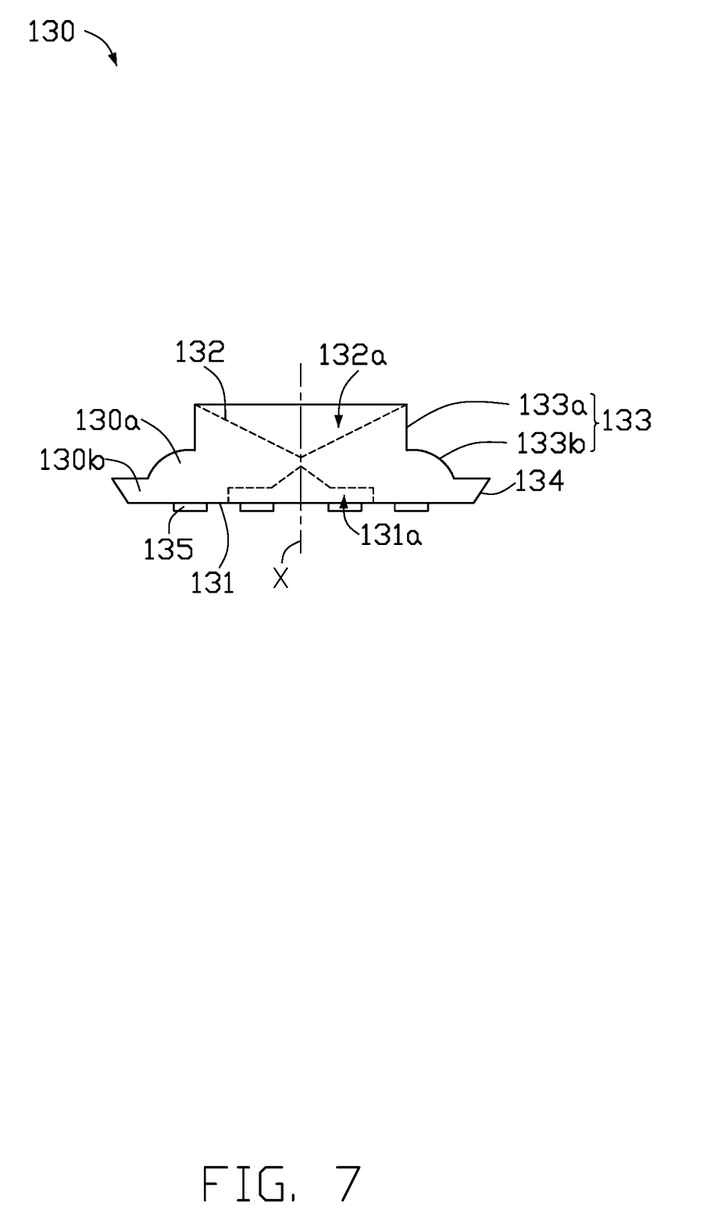
FIG. 7 is a side view of the optical lens.

As shown in FIG. 7, the bottom surface 131 is a surface of the base 130b away from the body portion 130a. The top surface 132 is a surface of the body portion 130a away from the base 130b. The optical lens 130 has an optical axis X. In one embodiment, the optical lens 130 is axisymmetric with respect to the optical axis X. A distance between the inclined surface 134 and the optical axis X gradually increases rising from bottom to top of the optical lens 130.

Surfaces defining the receiving space 131a include a pyramid surface. The pyramid surface extends upwardly and inwardly towards the optical axis X. Light from the light emitting element 110 strikes the pyramid surface, and is refracted towards a direction away from the optical axis X of the optical lens 130, thereby light from the light emitting element 110 is spread out over a large field.

The body portion 130a of the optical lens 130 further includes a light-emitting surface 133 coupling to and located between the inclined surface 134 and the top surface 132. In one embodiment, the light-emitting surface 133 connects the top surface 132 and a surface of the base 130b away from the bottom surface 131. The light-emitting surface 133 includes a first light-emitting surface 133a and a second light-emitting surface 133b.

The first light-emitting surface 133a extends downwardly and outwardly from an outer periphery of the top surface 132. In one embodiment, the first light-emitting surface 133a is a cylindrical surface which is perpendicular to the bottom surface 131 of the optical lens 130. In other embodiments, the first light-emitting surface 133a may have a ramp shape to increase a light exiting area of the optical lens 130.

The second light-emitting surface 133b extends downwardly from a bottom of the first light-emitting surface 133a and connects to the surface of the base 130b away from the bottom surface 131. In one embodiment, the second light-emitting surface 133b has an arc-shaped configuration which extends upwardly and inwardly toward the axis X, and an angle between the bottom surface 131 of the optical lens 130 and a tangential plane through any point in the second light-emitting surface 133b is less than 90 degrees. A distance between the second light-emitting surface 133b and the optical axis X of the optical lens 130 gradually decreases from bottom to top of the optical lens 130, whereby the second light-emitting surface 133b is a convex, arc-shaped surface. The shape of the second light-emitting surface 133b causes light emitting towards a direction away from the optical axis X of the optical lens 130 to be fanned out, such that, light emitted out of the optical lens 130 becomes more uniform, and the light emitting element 110 has a light distribution over a large area.

The top surface 132 extends inwardly and downwardly towards the optical axis X of the optical lens 130 from the top of the first light-emitting surface 133a. That is, the top surface 132 is recessed downwardly and inwardly towards the optical axis X of the optical lens 130 to have a substantially funnel-shaped configuration, or the top surface 132 can define a funnel recessed downwardly from a top of the first light-emitting surface 133a.

In one embodiment, the top surface 132 is a reflecting surface. Light from the light emitting element 110 travels into the optical lens 130 from surfaces defining the receiving space 131a. A portion of the light striking the first and second light-emitting surfaces 133a, 133b is directly emitted out of the optical lens 130 from the first and second light-emitting surfaces 133a, 133b. Another portion of the light strikes the top surface 132, and is reflected by the top surface 132 toward the first and second light-emitting surfaces 133a, 133b to be emitted out of the optical lens 130 from the first and second light-emitting surfaces 133a, 133b. That is, another portion of the light is reflected by the top surface 132 to leave the optical lens 130 through the first and second light-emitting surfaces 133a, 133b.

In one embodiment, the display panel 200 is a liquid crystal display (LCD) panel. A portion of light leaving the optical lens 130 strikes the reflective sheet 140 and is reflected by the reflective sheet 140 to the diffusion plate 160. Another portion of light leaving the optical lens 130 directly strikes the diffusion plate 160. The diffusion plate 160 diffuses the light and renders it uniform, and the light travels upwardly to illuminate the display panel 200.

Figure 9:
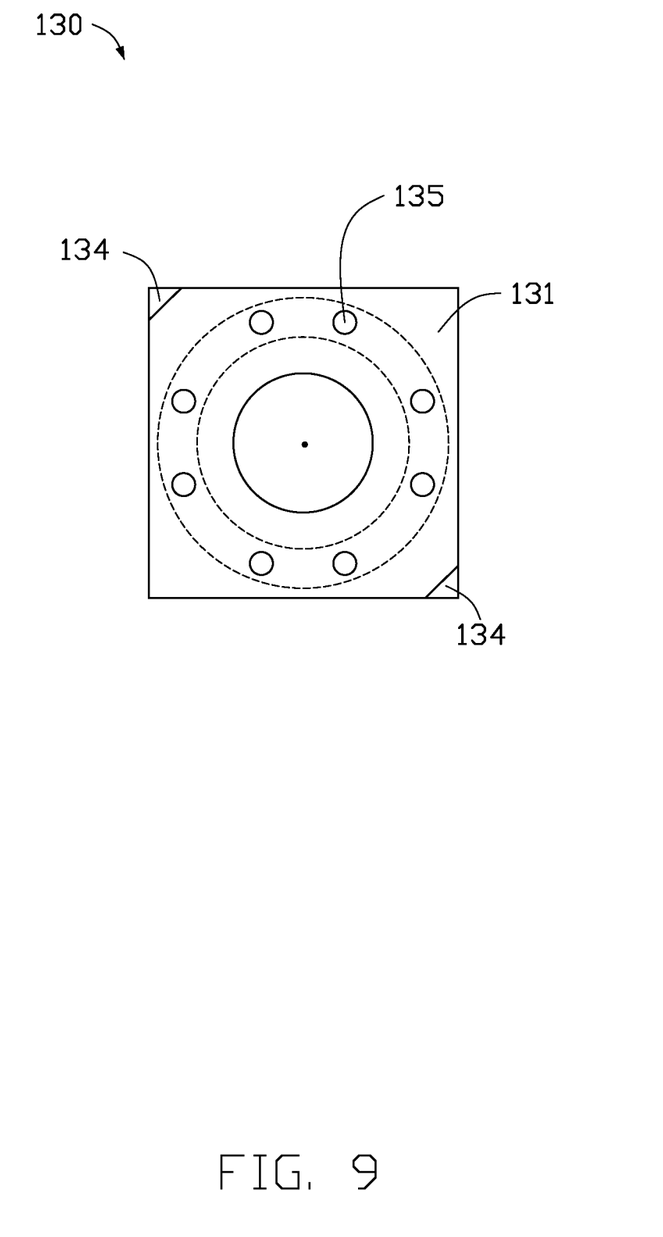
FIG. 9 is a bottom view of the optical lens.

As shown in FIGS. 6, 7, and 9, the optical lens 130 further includes a plurality of legs 135 on the bottom surface 131 for supporting the optical lens 130 above the light emitting element 110. Quantity of the legs 135 can be adjusted according to the actual needs.

In one embodiment, the bottom of each leg 135 is coated with an optical glue so that the optical lens 130 can be bonded to the circuit board 120 or the back plate 150.

In assembly, the light emitting elements 110 (e. g., LEDs) and the optical lenses 130 are mounted on the circuit board 12. Each light emitting element 110 is received in the receiving space 131a of one optical lens 130. The reflective sheet 140 is engaged into the openings formed by the inclined surfaces 134 of each optical lens 130 and the circuit board 120 with each optical lens 130 extends out of the corresponding through hole 141. In other words, the portion of each optical lens 130 where the inclined surface 134 is formed extends out of the through hole 141 to be mounted on the surface of the reflective sheet 140 which is away from the circuit board 120.

Unlike the conventional art, there is no need to repeatedly move the reflecting sheet 140 to be position it precisely, and there is no need to adhere the reflecting sheet 140 to the back plate 150 by an adhesive. The assembly process is simplified, the assembly efficiency is high, and problem of loss of adhesiveness between the back sheet 150 and the reflective sheet 140 during movement is avoided.

In addition, since a depth of the openings formed by the reflective sheet 140 engaged in the inclined surface 134 of the optical lens 130 and the printed circuit board 120 is not a large distance, the reflective sheet 140 can be directly lifted from the openings. When a certain light emitting element 110 or whole circuit board 120 fails, the certain light emitting element 110 or the circuit board 120 can be replaced or repaired by simply lifting the reflective sheet 140 directly from the openings, the maintenance can be done much more quickly.

Figure 10:
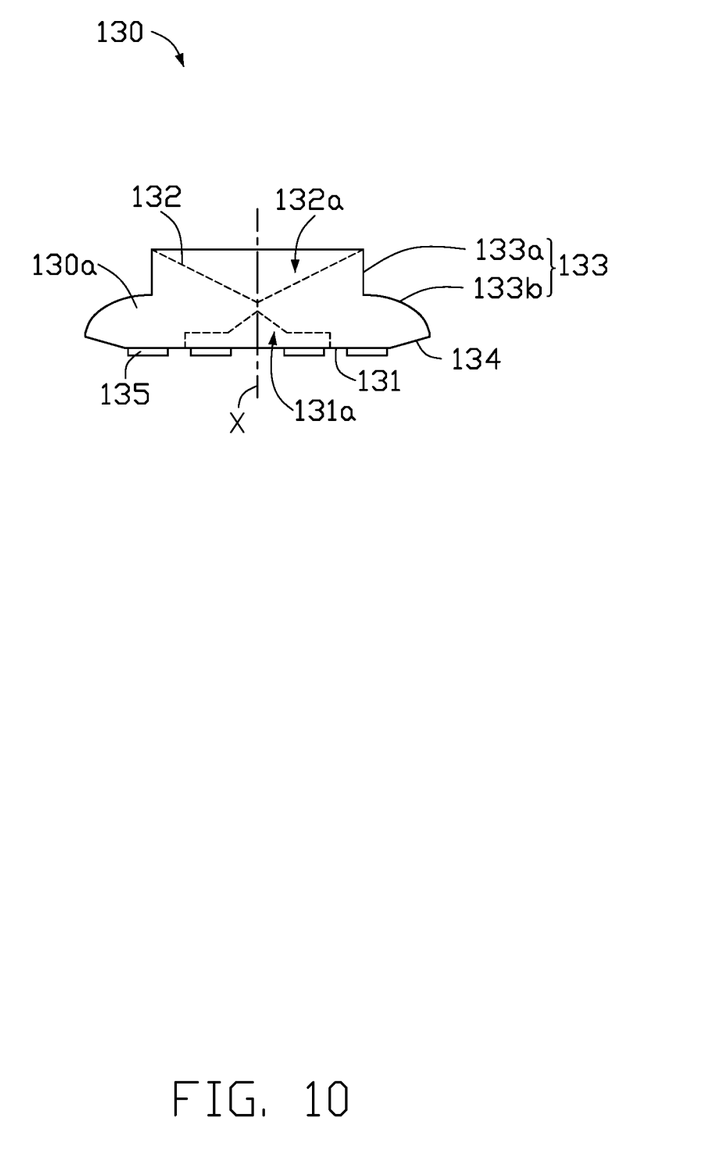
FIG. 10 is a side view of an optical lens according to another embodiment.

In another embodiment, as shown in FIG. 10, the optical lens 130 does not include the base 130b. That is, the optical lens 130 only includes a body portion 130a. The bottom surface 131 is a surface of the body portion 130a, and the at least one inclined surface 134 extends from an outer periphery of the bottom surface 131 toward the top surface 132.

Second Embodiment

As shown in FIGS. 11 through 14, the main difference between the optical lens 230 and the optical lens 130 is that the top surface 132 is a refractive surface. Light from the light emitting element 110 travels into the optical lens 230 from surfaces defining the receiving space 231a. A portion of the light from the light-emitting surface 233 directly leaves the optical lens 230. Another portion of the light directly leaves the optical lens 230 from the top surface 232. That is, light entering the optical lens 230 is mainly incident on the diffusion plate 160 from the light-emitting surface 233 and the top surface 232.

Figure 11:
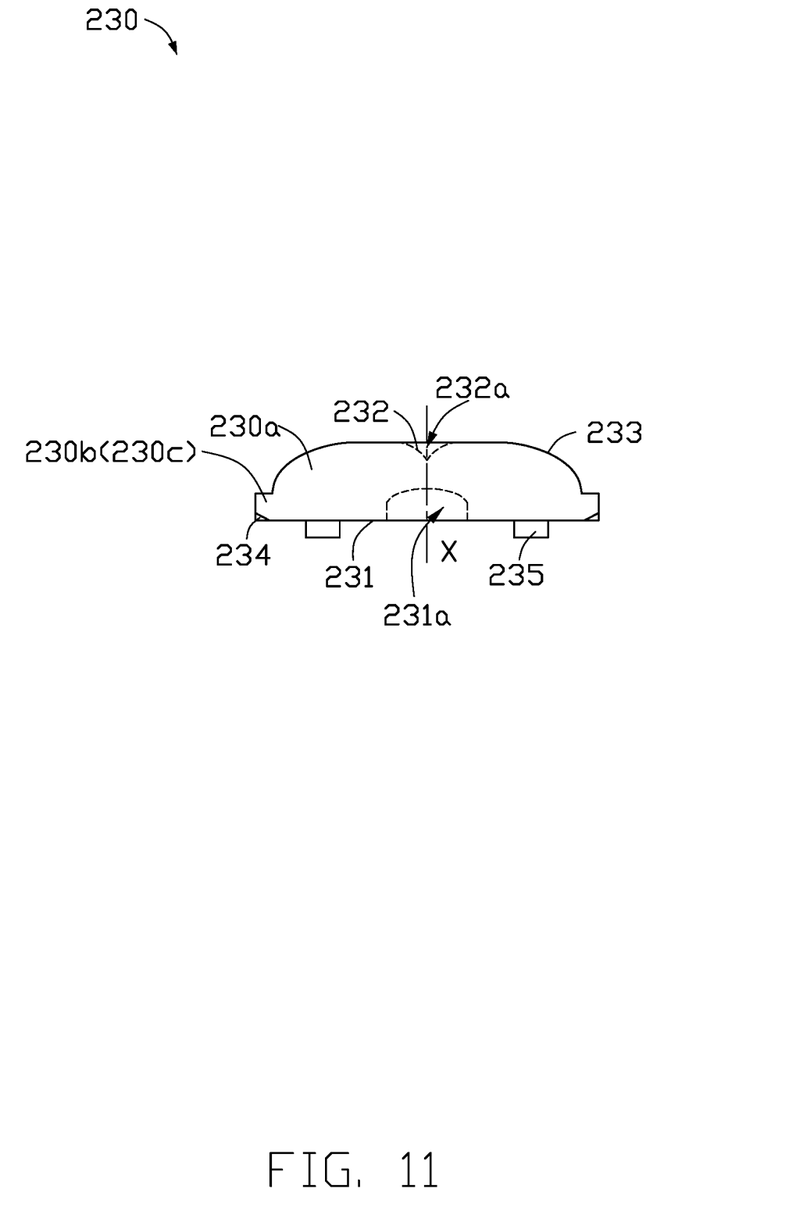
FIG. 11 is a side view of an optical lens according to a second other embodiment.

As shown in FIG. 11, the receiving space 231a is arranged in an arc shape, which is favorable for guiding the light from the light emitting element 110 to enter the optical lens 230, thereby the light emitting element 110 spreads the light into a large field. The light-emitting surface 233 is a convex, arc-shaped surface, the top surface 232 has a substantially funnel-shaped configuration. Thereby, light emitted out of the optical lens 230 becomes more uniform, and the light emitting element 110 has a large light distribution.

Figure 12:
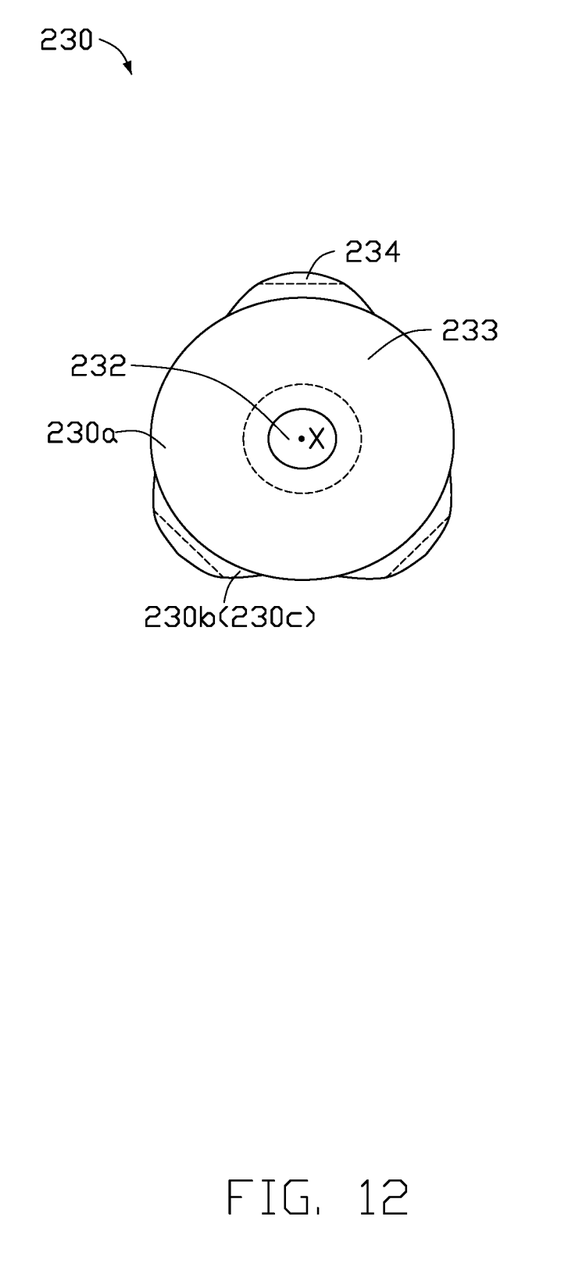
FIG. 12 is top view of the optical lens shown in FIG. 11.

As shown in FIG. 12, the base 230b includes a plurality of protrusions 230c protruding from the body portion 230a. The protrusions 230c are spaced apart from each other. The inclined surface 134 is formed at an end of each of the protrusions 230c away from the body portion 230a.

Figure 13:
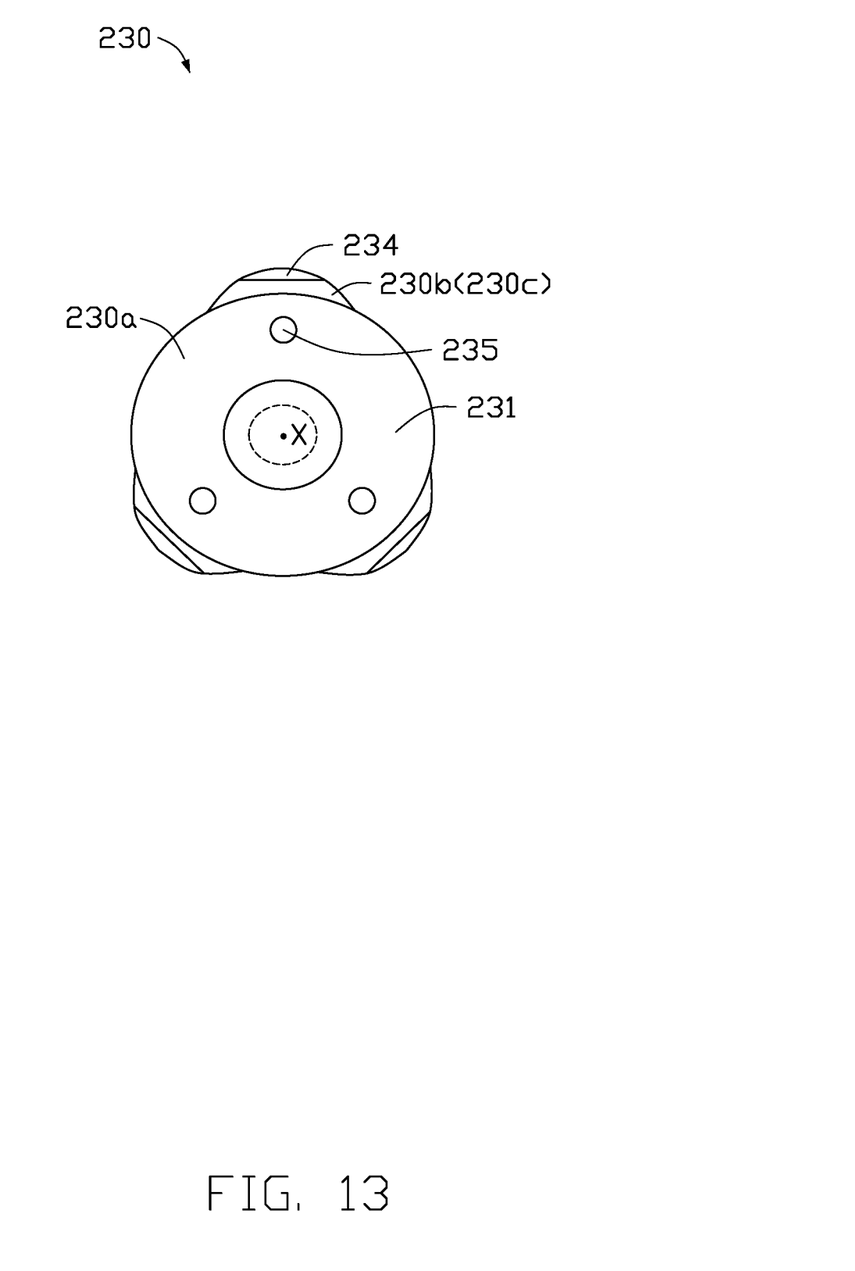
FIG. 13 is a bottom view of the optical lens shown in FIG. 11.
Figure 14:
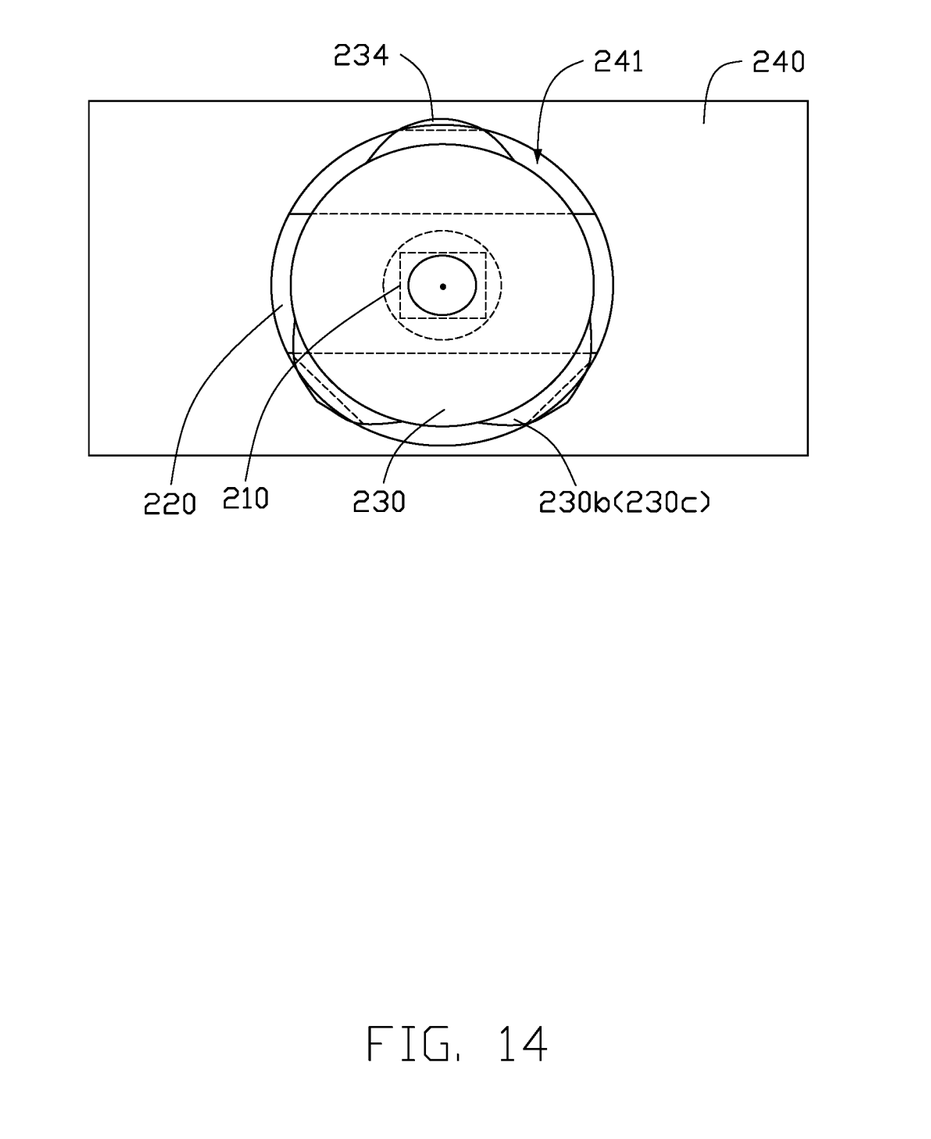
FIG. 14 is an assembled view of a backlight module.

As shown in FIG. 13, the optical lens 230 includes three legs 235 that are equally spaced.

In the first embodiment, light is mainly emitted from the periphery (light-emitting surface 133) of the optical lens 130, and the light emitting angle is large. The optical lens 130 can be applied, for example, to a street light or an indoor lighting fixture. In the second embodiment, light is mainly emitted from top surface 232 of the optical lens 230, and is not easily affected by the packaging of the light emitting element 110. The optical lens 230 can be applied to small angle lighting fixtures, such as spotlights or ceiling lamps.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A optical lens, comprising:
    a bottom surface defining a receiving space for receiving a light emitting element;
    a top surface opposite to the bottom surface;
    at least one inclined surface extending from an outer periphery of the bottom surface toward the top surface; and
    a light-emitting surface coupling to and located between the inclined surface and the top surface, wherein the inclined surface and the bottom surface intersect to form an obtuse angle;
    wherein the optical lens comprises a body portion and a base connected to the body portion, the bottom surface being a surface of the base away from the body portion, and the top surface being a surface of the body portion away from the base;
    the base comprises a plurality of protrusions protruding from the body portion and spaced apart from each other, and at least one of the plurality of protrusions is formed with the inclined surface.

2. The optical lens according to claim 1, further comprising at least two legs on the bottom surface.

3. The optical lens according to claim 2, wherein the optical lens has an optical axis, the optical lens is axisymmetric with respect to the optical axis, and a distance between the inclined surface and the optical axis gradually increases rising from bottom to top of the optical lens.

4. The optical lens according to claim 1, wherein the light-emitting surface extends from an outer periphery of the top surface, and a portion of light from the light emitting element directly leaves the optical lens from the light-emitting surface.

5. The optical lens according to claim 4, wherein the top surface extends from the light-emitting surface towards the bottom surface to have a funnel-shaped configuration.

6. The optical lens according to claim 5, wherein the top surface is a reflecting surface, another portion of light from the light emitting element is reflected by the top surface to leave the optical lens from the light-emitting surface.

7. The optical lens according to claim 5, wherein the top surface is a refractive surface, another portion of light from the light emitting element directly leaves the optical lens from the top surface.

8. A backlight module comprising:
a circuit board;
a light emitting element on the circuit board and electrically connected to the circuit board;
a reflective sheet defining a through hole corresponding to the light emitting element; and
an optical lens comprising:
 a bottom surface defining a receiving space for receiving the light emitting element;
 a top surface opposite to the bottom surface; and
 at least one inclined surface extending from an outer periphery of the bottom surface toward the top surface, and a light-emitting surface coupling to and located between the inclined surface and the top surface, wherein the inclined surface and the bottom surface intersect to form an obtuse angle; the light emitting element is received in the optical lens, the optical lens is mounted on the circuit board through the through hole, and the reflective sheet is engaged in an opening formed between the inclined surface and the circuit board;
 wherein the optical lens comprises a body portion and a base connected to the body portion, the bottom surface being a surface of the base away from the body portion, and the top surface being a surface of the body portion away from the base;
 the base comprises a plurality of protrusions protruding from the body portion and spaced apart from each other, and at least one of the plurality of protrusions is formed with the inclined surface.

9. The backlight module according to claim 8, wherein the optical lens comprises at least two legs on the bottom surface for supporting the optical lens above the light emitting element.

10. The backlight module according to claim 9, wherein the light-emitting surface extends from an outer periphery of the top surface, and a portion of light from the light emitting element directly leaves the optical lens from the light-emitting surface.

11. The backlight module according to claim 10, wherein the top surface extends from the light-emitting surface towards the bottom surface to have a funnel-shaped configuration.

12. The backlight module according to claim 11, wherein the top surface is a reflecting surface, another portion of light from the light emitting element is reflected by the top surface to leave the optical lens from the light-emitting surface.

13. The backlight module according to claim 12, wherein the top surface is a refractive surface, another portion of light from the light emitting element directly leaves the optical lens from the top surface.

14. A display device, comprising:
a display panel; and
a backlight module on a side of the display panel for providing backlight to the display panel;
wherein the backlight module comprises:
 a circuit board;
 a light emitting element on the circuit board and electrically connected to the circuit board;
 a reflective sheet defining a through hole corresponding to the light emitting element; and
 an optical lens comprising a bottom surface defining a receiving space for receiving the light emitting element, a top surface opposite to the bottom surface, at least one inclined surface extending from an outer periphery of the bottom surface toward the top surface and a light-emitting surface coupling to and located between the inclined surface and the top surface,
wherein the inclined surface and the bottom surface intersect to form an obtuse angle; the light emitting element is received in the optical lens, the optical lens is mounted on the circuit board through the through hole, and the reflective sheet is engaged in an opening formed between the inclined surface and the circuit board;
the optical lens comprises a body portion and a base connected to the body portion, the bottom surface being a surface of the base away from the body portion, and the top surface being a surface of the body portion away from the base;
the base comprises a plurality of protrusions protruding from the body portion and spaced apart from each other, and at least one of the plurality of protrusions is formed with the inclined surface.

* * * * *